United States Patent [19]

Banta

[11] 4,194,521
[45] Mar. 25, 1980

[54] FIRE PROTECTIVE STRUCTURE

[75] Inventor: Fred L. Banta, Edgewood, Ky.

[73] Assignee: Burndy Corporation, Norwalk, Conn.

[21] Appl. No.: 817,402

[22] Filed: Jul. 20, 1977

[51] Int. Cl.² ............ E04B 1/94; F16L 3/02; H01B 7/34
[52] U.S. Cl. ............ 137/67; 52/232; 98/1; 174/16 R; 248/1; 248/49
[58] Field of Search ............ 137/67; 169/48; 248/49, 248/68 R; 52/1, 232; 174/16 R, 68 C, 72 A; 98/1 R

[56] References Cited

U.S. PATENT DOCUMENTS

| 2,142,164 | 1/1939 | Young et al. | 52/232 |
| 3,035,800 | 5/1962 | McLeod | 248/68 R |
| 3,864,883 | 2/1975 | McMarlin | 52/221 |
| 3,932,696 | 1/1976 | Fork et al. | 52/221 X |
| 3,976,825 | 8/1976 | Anderberg | 248/56 X |

FOREIGN PATENT DOCUMENTS 2254182  7/1975  France ............ 169/48

OTHER PUBLICATIONS

Dalton, W. F. et al., *Ventilated Cover*; IBM Technical Disclosure Bulletin, vol. 6, No. 2, Jul. 1963, p. 23.

Lindner, R. J., *Machine Base*; IBM Technical Disclosure Bulletin, vol. 16, No. 3, Aug. 1973, p. 905.

*Primary Examiner*—Martin P. Schwadron
*Assistant Examiner*—Richard Gerard
*Attorney, Agent, or Firm*—Howard S. Reiter

[57] ABSTRACT

This invention relates to structural devices which include intumescent material for the purpose of inhibiting the flow of heated air, smoke, and other products of extraordinary heat conditions, as in the case of a fire, from flowing therethrough. In one embodiment, useful as a tray for supporting insulated electrical conductors, a structure with double floor members spaced apart from each other, has convection holes in both of the floor members. The holes in one of the members are out of alignment with the holes in the other, and the top surface of the lower floor member has intumescent material positioned thereon. Thereby, upon exposure of the lower floor member to the heat of a fire for example, the intumescent material will expand, causing either or both the holes and the passageways that are described by the space between the holes of one floor member and those of the other floor member, to become blocked, thereby preventing the passage of heat, smoke and flame therethrough, to localize the fire, and deter consequent damage to the cables being held in the tray.

13 Claims, 10 Drawing Figures

FIRE PROTECTIVE STRUCTURE

BACKGROUND OF THE INVENTION

The use of intumescent material in cable ducts, for the purpose of preventing the duct from, in effect, becoming a flue for the transmission of smoke, heat and flame from one area to another, is known. Thus, for example, in non-ventilated cable raceways, such as in the so-called under-floor duct commonly used to house cables, telephone lines, electrical wires, etc., in office and apartment buildings, where it is desired to help prevent transmission of damaging effects of fire within the raceway from one section of the building to another, intumescent materials are known to have been utilized.

By an intumescent material is meant one which enlarges, swells or bubbles upon exposure to heat above pre-determined levels. Thus, for example, so-called "FLAMAREST 1600," as marketed by Avco Systems Division of Lowell, Mass., is an intumescent, epoxy coating, containing an intumescent component designed for both interior and exterior use and many industrial applications. It is a two-component, catalyzed, epoxy resin which fuses into a porcelain-like shield to protect the substrate while providing a highly efficient barrier against flame and heat.

Typically, such coatings may be applied in a thickness of 20 to 25 mils. As the coating is exposed to heat at a preselected level, for example, 500° F., the resin softens and the intumescent material begins to change state and evolves from a high density film to a low density "intumescent char," wherein a multiplicity of air cells in the char act as insulators and keep the substrate cool. As an intumescent mechanism, the foregoing phenomenon may be completed in a matter of seconds, for example, 30 seconds or so, after the coating is exposed to heat and/or fire. By positioning such material in a confined passageway, such as the interior of a cable raceway, it is possible to have the intumescent char traverse the cross-section of the passageway such that, upon completion of the heat exposure cycle of the intumescent material, the passageway becomes effectively blocked. This concept has been adopted in the design of enclosed under-floor ducts, for example, as hereinbefore described.

In addressing the question of utilizing intumescent material in generally open, ventilated devices such as cable trays, it must be kept in mind that the problems involved are significantly different than those in generally non-ventilated structures, such as cable raceways and the like.

Typically, one form of cable tray is made as a flat, hung-support member, having a multiplicity of holes for the liberal convection of air therethrough, so that heat generated in the cables in the normal course of use may be easily and adequately dissipated. However, this very feature of enhancement of convection in normal circumstances becomes undesirable in extreme cases such as fire in the ambient region in which the trays are located because, inherently, it tends to enhance the passage of heat and flame into, through and around the areas in which the cables are positioned. In the past, where the consequences of destruction of cables due to these phenomena were mainly mere power losses, concern was somewhat less than now, when the destruction of cables can have the effect of rendering inoperative control, servo, and other mechanisms and devices, which may be critical to health or safety, as, for example, reaction control devices, in nuclear-reactor installations. It might be thought that to address this problem by coating the inside of the holes in such cable trays with intumescent material, would suffice, with the idea that upon exposure to heat, the material would expand and shut off the convective paths. However, the heat from a fire in an ambient region can be so intense, and the consequent "flue effect" through the ventilating holes in a direction normal to the tray can be so pronounced, that by the time a sufficient amount of time has passed for the intumescent material to begin to react to the sudden heat rise, the rate of convection through the holes, coupled with the relatively fragile "char" state of the intumescent material as it approaches its fully expanded condition, can cause the blocking to be inhibited, or even totally precluded.

Accordingly, it is an object of this invention to provide a means for selectively and automatically restricting the flow of heated air through structures, which are intended to encourage free ventilation under usual circumstances.

Another object of this invention is to provide such means in a fashion most likely to achieve effective restriction of the flow of heated air under extraordinary conditions.

Yet another object of this invention is to provide means to satisfy the foregoing objectives, which is structurally sound from an engineering standpoint for its intended functional use, such as supporting cables, and, at the same time, is structurally simple and comparatively inexpensive to produce.

Still another object of this invention is to provide means to satisfy the foregoing objectives using materials and structures which are reliable and effective.

SUMMARY OF THE INVENTION

Desired objectives may be achieved through practice of the present invention, one embodiment of which comprises a structure having walls secured in spaced-apart relationship with respect to each other, in which air and/or gasses may pass between convection holes in one of the walls and convection holes in the other of the walls, the holes in one wall not being aligned with the holes in the other of the walls. Intumescent material is positioned in the passageway between the holes in each of the walls for obstructing the flow of air therebetween upon thermal activation. Another embodiment of this invention comprises such a structure wherein the walls defining the passageway are the double floor members of the cable tray device, and further embodiments in which one or both of the floor members are of the so-called "corrugated" construction. Unperforated portions of the structure are positioned substantially opposite the convection holes in at least one of the walls such that intumescent material may form a char between the hole and the unperforated portion.

DESCRIPTION OF DRAWINGS

This invention will be clear from the description which follows and from the accompanying drawings in which

FIG. 9 is a cross-sectional view of still another embodiment of this invention; while

DESCRIPTION OF PREFERRED EMBODIMENTS

Figure 1:
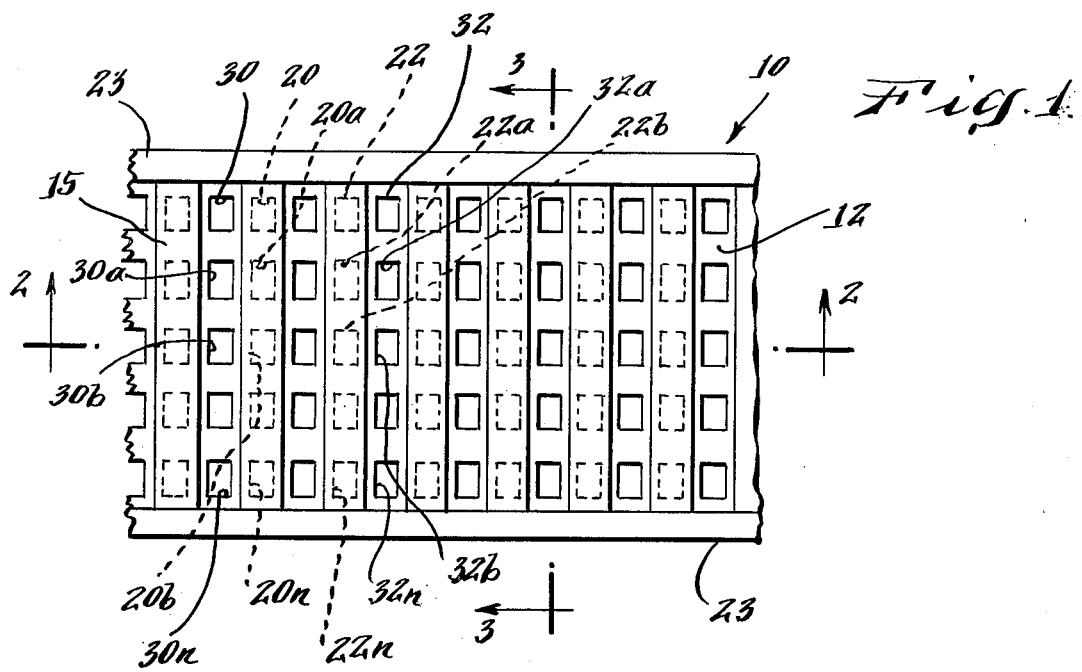
FIG. 1 is a plan view of an embodiment of this invention.
Figure 2:
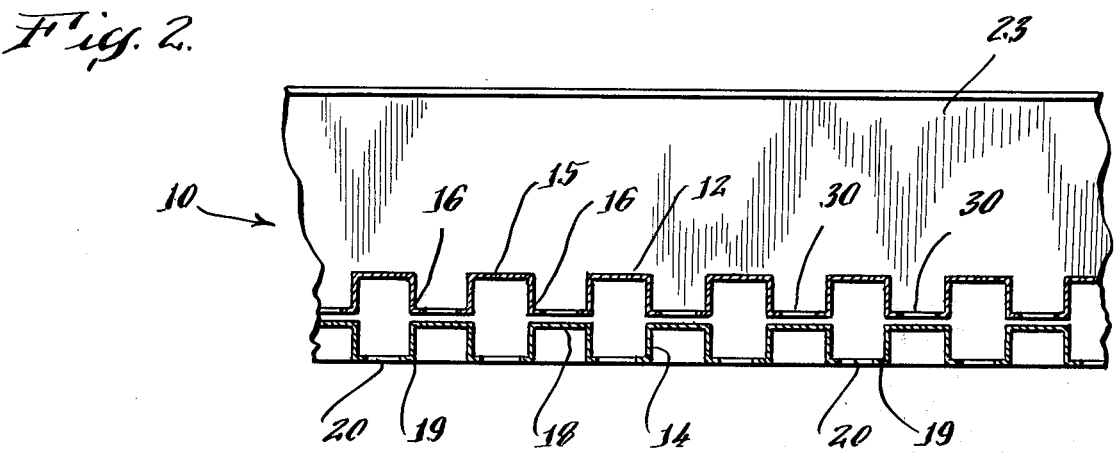
FIG. 2 is a cross-section of the embodiment of this invention as shown in FIG. 1 taken along section line 2—2.
Figure 3:
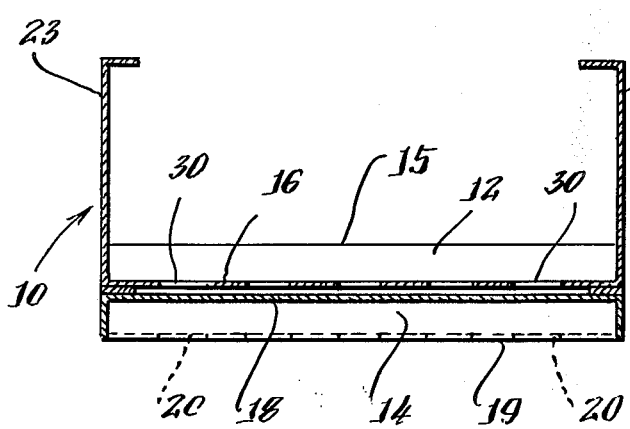
FIG. 3 is a cross-section of the embodiment of this invention shown in FIG. 1 taken along section line 3—3.

Referring first to FIGS. 1 through 3, there is depicted an embodiment of this invention useful for use as a cable tray support device comprising a floor section having two component layers 12, 14. As may be seen particularly in FIG. 1, the upper floor member 12 includes rows of convection holes 30, 30a, 30b, ... 30n; 32, 32a, 32b, ... 32n; ... (etc.) oriented substantially normal to the long axis of the structure. Similarly, the lower floor member 14 has rows of holes 20, 20a, 20b ..., 20n; 22, 22a, 22b, ... 22n; ... (etc.), which also are oriented substantially normal to the long axis of the device. It will be noted particularly from FIG. 2 that the upper floor member 12 is "corrugated." As there illustrated, these corrugations are substantially "U" shaped in cross-section, since this is a usual structural feature of cable tray devices. It should be understood, however, that although such U-shaped corrugations are shown here for purposes of illustration, corrugations of other configurations, such as triangles, elipses, sinusoids, etc., may be also or alternatively be utilized without departing from the spirit or scope of this invention.

Referring to FIG. 2, it will be seen that the top member 12 is made in a corrugated configuration with lands or peaks 15 and grooves 16, and that in this particular configuration, the grooves 16 have holes 30 positioned therein. Correspondingly, the lower floor member 14 has peaks or lands 18 and grooves 19, the latter of which have holes 20 therethrough. It will be noted further, particularly from FIG. 2, that the corrugations of one of the layers are substantially parallel to the corrugations of the other layers, with the peaks of each positioned substantially opposite the peaks of the other, and with the valleys of each positioned substantially opposite the valleys of the other. By such juxtapositioning of such floor members, it will be further seen, particularly from FIG. 2, that as between floor members the hole sequence alternates; that is, proceeding from left to right substantially at right angles to the axial lines of the corrugations, one comes first to a hole in the lower floor member, and then to a hole in the upper floor member, and so forth. Thus, it will be clear that, as between the two floor members, the holes in them respectively form convection passageways which are tortuous; that is, tend not to be straight but instead, are along devious paths, since the holes in one of the members are out of alignment (i.e. not positioned opposite) the holes in the other of the members.

FIG. 3 further illustrates this embodiment of the present invention, showing, in addition, hangars 24, by which the double floored structure may be suspended, as, for example, from supporting trusses or other known per se support members (not shown).

Figure 4:
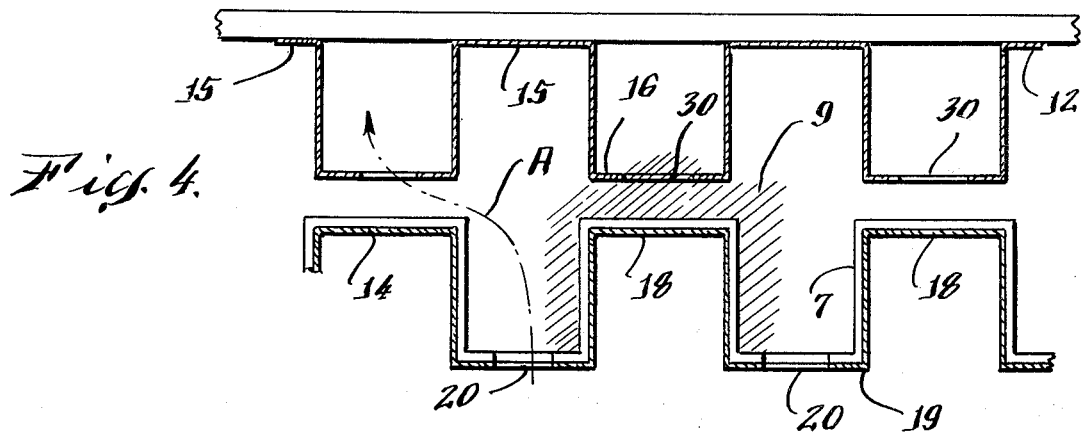
FIG. 4 is a cross-section view of another embodiment of this invention.

Turning now to FIG. 4, there is illustrated in greater detail a cross-section of the embodiment shown in FIG. 2. In addition to the structural features shown in FIG. 2, FIG. 4 illustrates the further application of an intumescent material 7 on the upper side of the lower floor member, i.e. on the inside of the passageways between the holes 30 of the upper floor member and the holes 20 of the lower floor member. By this means, the normal convective flow path (A) of air through the cable tray device which, as is known, has a beneficial cooling effect on the cables 5 being supported on the top of peaks 15 of the upper floor member 12, may, upon the application of heat, be caused to become closed when the intumescent material 17, reacting to the heat, turns into intumescent char 9. This phenomena may be seen to have effectively closed off the passageway between the groove hole 30 in the upper floor members 12 and the convection hole 20 in the lower floor member 14. This phenomena, repeated along a substantial portion of the entire tray length will, of course, have the effect of reducing the thermal exposure of the cables, therefore causing them at least to remain operative for a substantially longer period of time, and perhaps even to survive totally an exposure that might otherwise cause them to fail. It should be noted in particular that in the embodiment shown in FIG. 4, assuming that the most immediate exposure to fire in the ambient environment is at the underside of the under-floor member 14, the intumescent material 7, particularly in the area above the valley 18 of the lower floor member 14, may be expected to react quickly to the exposure to flames on the tray floor member 14 of heat transmitted conductively to the region where the intumescent material is positioned immediately below the hole 30 in the bottom of the valley of the upper floor member 12. Thus, this relatively rapid time response, as well as the structural feature of having the intumescent material, as it changes towards becoming intumescent char 9, firmly positioned and supported on the upper side of the valley 18 in the lower floor member 14, as a support base, tends to minimize the "flue effect" which might otherwise occur. For applications such as are discussed here, the space between the two floor members may be typically from, say ⅛" to 1". Preferably the space will be selected to permit adequate ventilation air flow under normal circumstances bur will permit the intumescent char to obstruct air and gas passage under extreme cases when the char is formed.

Figure 5:
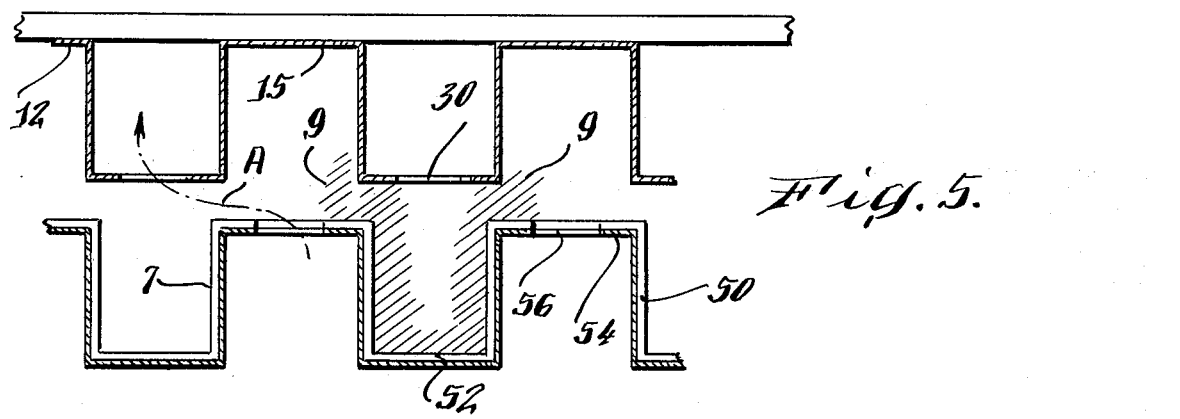
FIG. 5 is a cross-sectional view of yet another embodiment of this invention.
Figure 6:
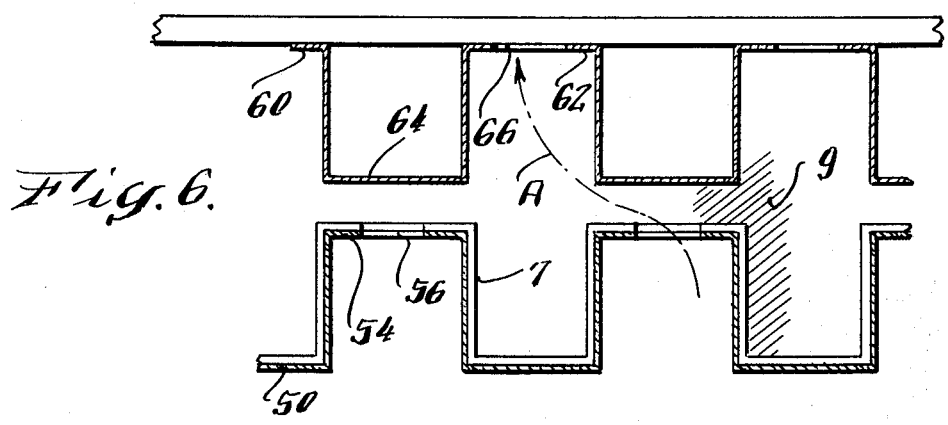
FIG. 6 is a cross-sectional view of yet another embodiment of this invention.

FIG. 5 illustrates another embodiment of this invention. It will be seen that the upper floor member 12 in this embodiment corresponds to the upper floor member 12 shown in FIG. 4. However in the embodiment shown in FIG. 5, the lower floor member 50 has peaks 52 and grooves 54, in the bottom of which grooves are positioned holes 56. Thus, passageways for the flow of air along path (A) are effectively defined between the holes 56 in the valleys of the lower member 50 and the holes 30 in the valleys of the upper member 12. As is the case with the embodiment shown in FIG. 4, the reaction time of the intumescent material to heat applied to the underside of the lower floor member 50 should be expected to be relatively rapid because of the ability of the material of the lower floor member 50 to transmit heat and thereby cause the generation of intumescent char 9 to block the passageways between holes. However, it will also be noted that in this embodiment, the width and alignment of the upper side of the valleys 54 of the lower floor member 50 are such that they do not provide as broad a structural support member for the generated intumescent char 9 as is the case with an embodiment like that shown in FIG. 4. Turning now to FIG. 6, there is illustrated an embodiment of the present invention having a lower floor member substantially corresponding to that shown in FIG. 5. However, in the embodiment shown in FIG. 6, the upper floor member 60 has valleys 64, and peaks 62 in which are positioned the holes 66. Thus, in this embodiment, the effective convective passageway for air is illustrated as being along the flow path (A) from holes 56 in the grooves of the lower floor member 50 to holes 66 in the peaks of the upper floor member 60. It will also be apparent that although, in this embodiment, the upper side of the grooves 54 in the lower floor member 50 provide a better structural support for the generated intumescent char 9 than that shown in FIG. 5 and can be expected to exhibit similar thermal conductivity and therefore intumescent char actuation characteristics as the embodiment shown in FIG. 5, the structural support characteristics for the intumescent char are better than those shown in FIG. 4.

Figure 7:
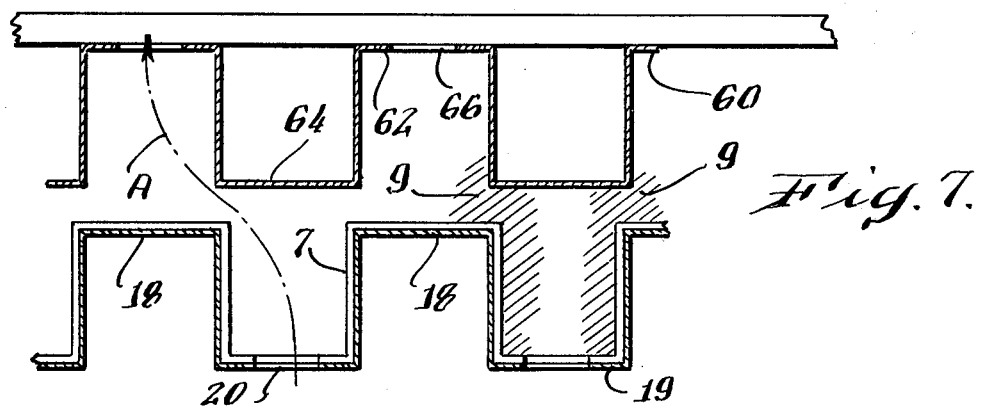
FIG. 7 is a cross-sectional view of still another embodiment of this invention.

FIG. 7 illustrates an embodiment of this invention having an upper floor member 60 with elements substantially corresponding to the upper floor member illustrated in FIG. 6, along with a lower floor member 14 having structural characteristics substantially corresponding to the lower floor member shown in FIG. 4. It will be apparent that in the embodiment of this invention shown in FIG. 7, although the thermal actuation through conduction may be expected to be substantially as fast as that which can be expected to be experienced with the embodiment shown in FIG. 4, the structural support for the generated intumescent char 9 is not as broad or well positioned as that shown in FIG. 4.

Thus, from the foregoing, although it will be understood that the embodiments shown in FIGS. 4, 5, 6 and 7 all fall within the contemplation of this invention, it is believed that the embodiment shown in FIG. 4 may be expected to prove to be the most significant technically as well as commercially because of the comparative speed with which its intumescent material will be actuated and the structural features it provides by way of char support and passageway configuration, with consequent attenuation of "flue effect."

Figure 8:
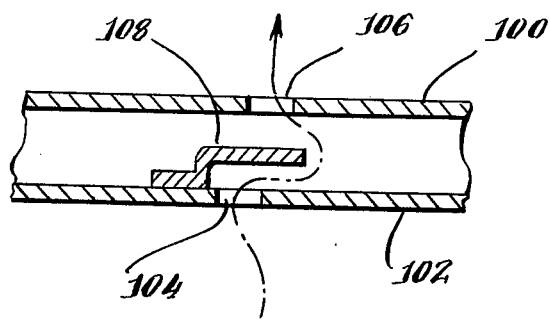
FIG. 8 is a cross-sectional view of still another embodiment of this invention.
Figure 10:
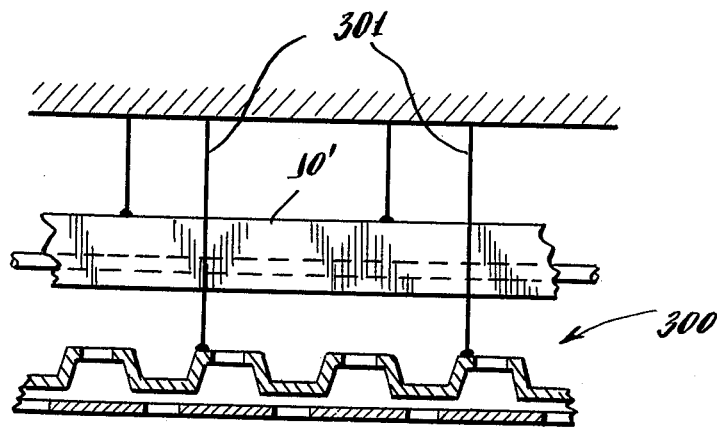
FIG. 10 illustrates an installation application for an embodiment of this invention.

Further, from the foregoing, it will be apparent that the principles of this invention may find application in a wide variety of structural embodiments other than cable trays of the configuration hereinbefore described. Thus, for example, a relatively simple panel insert, not necessarily designed to be a cable tray per se or to be used only with cable trays, may be made of parallel, separated wall members with non-aligned holes, to act as an intumescent barrier to an otherwise fluid transmissive structure, or as a flame gas, and the like barrier for other structures as shown in FIG. 10. Thus, it may be used as a vertical wall panel, or as a slab-like floor member to dropped in the bottom of a cable tray or other normally convective permissive structure. Similarly, although the protected device, such as the cables hereinbefore described, may be positioned in the convective topmost position (e.g., atop the top member of a cable tray), they may also be positioned between the upper and lower floor members, even though the exposure to conductive heating may be somewhat greater, since in such an intermediate posture, ultimate surrounding by char can have substantially similar heating inhibiting effect, with consequent preservation benefits. Further, it will be apparent that the desired effect of providing a good foundation base for the intumescent char so as to inhibit "flue effect" to a desired degree, may also be achieved by erecting intermediate baffles between otherwise aligned holes so as to produce the desired tortuous flow path with an adequate support base for generated char. Such a structure is illustrated in FIG. 8, wherein an upper plate 100 with holes 106 and a lower plate 102 with holes 104 have a baffle 108 positioned between the otherwise aligned holes 104, 106. As a result, this flow path (A) is rendered tortuous, whereby intumescent material positioned atop the baffle 108 will be adequately supported structurally to effect blocking of the hole 106 and cessation of convective flow along path (A) upon actuation. Thus, it will be clear that as used in this specification and the accompanying claims, the term "non-aligned holes," or its equivalent, should be taken to mean, in effect, holes between which flow is effected along a path such that the convectively egress hole substantially entirely faces an intumescent material bearing surface, such that upon actuation, the resulting intumescent char is provided with an adequate structural foundation to block the hole or otherwise cut off the normal flow path in the face of "flue effect" which might otherwise tend to keep it open.

Figure 9:
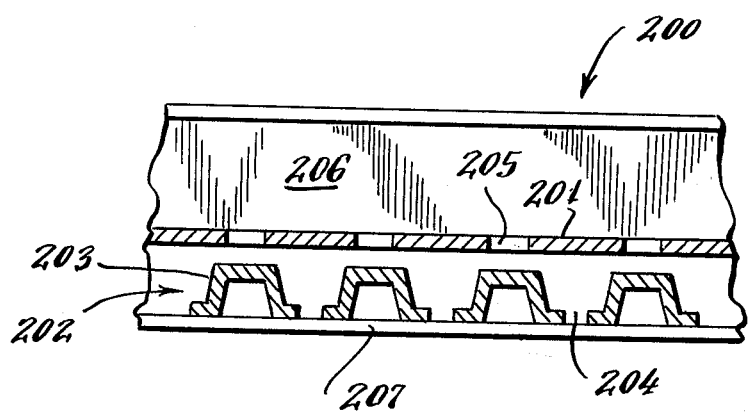

FIG. 9 illustrates a specific embodiment of this invention in which a ventilated structure designated generally 200 comprises a perforated wall element 201 which is spaced from another wall 202 which is defined by a plurality of spaced-apart members 203 wherein the spaces 204 between adjacent members 203 define openings which are out of alignment with openings 205 in the planar element 201. The element 201 although shown to be generally planar in shape may assume any of the corrugated forms previously discussed. Elements 201 and the members 203 are held in spaced-apart relationship by conventional side rails 206 having a lower flange 207 if desired.

FIG. 10 illustrates an installation application in which a conventional cable support tray or the like 10', is protected from fire beneath by a ventilated barrier structure 300 suspended beneath it on any conventional suspension or hanger means 301. The barrier 300 in such an installation may correspond to any of the structures herein described or their equivalents.

Although any of a number of intumescent materials may be utilized in the practice of the present invention, it has been found advantageous in connection with embodiments of the invention, particularly of the type herein described, to utilize one which is a catalyzed, epoxy coating containing particulate, intumescent salts and an oxidative resistance additive, since the latter has the beneficial effect of inhibiting oxidation of the intumescent char to the point where it becomes relatively embrittled and therefore structurally less resistant to the adverse effects of the application of further heat and convective currents. The epoxy binder system used in such a coating may be a mixture of an epoxide and a flexibilizing agent to provide a durable, tough, weatherproof overall coating system. Pigmentation of the material may be adjusted also to improve high temperature performance. It is to be regarded as known to make such modifications of commercial materials as are necessary to achieve these ends. This description however, is by no means meant to be exclusionary but is detailed here merely to demonstrate that any of a range of modifications may be made in accordance with accepted technical practices and still be within the contemplation of this invention.

Accordingly it is to be understood that the embodiments of this invention herein disclosed, described and shown, are by way of illustration and not of limitation, and that this invention may be practiced in a wide variety of embodiments by those skilled in the cognizant arts without departing materially from the spirit or scope of this invention.

I claim:

1. A ventilating structure for permitting free air circulation therethrough under ordinary ambient temperature conditions and for shielding objects on one side thereof from smoke, heat and flame originating on the opposite side thereof under extraordinary ambient temperature conditions, wherein:

said structure has an overall flat plate-like configuration characterized by an overall surface area significantly greater than the cross-section area thereof;

said structure comprising a pair of wall portions each defining a surface of said plate-like structure;

each of said wall portions having a plurality of closely spaced ventilating openings therethrough distributed substantially uniformly over the surface of said wall portions and dimensioned such that the total area of said openings is a significant portion of the overall area defined by each such wall portion, while the area of any one opening is substantially less than a significant portion of the overall area of such wall portion;

said wall portions being closely positioned in substantially parallel spaced-apart relationship so that the ventilating openings in one of said wall portions are not in alignment with the ventilating openings in the other of said wall portions, for defining a space therebetween through which air may flow freely in through the ventilating openings in said one wall portion and out through the openings in the said other wall portion under ordinary ambient temperature conditions; and intumescent material positioned in the space between said wall portions distributed substantially uniformly throughout the length and width of said space and located so as to permit free flow of air through said structure under ordinary ambient temperature conditions, for obstructing the flow of air through said structure upon said material being activated into intumescent char under extraordinary ambient temperature conditions.

2. The device described in claim 1 wherein at least one of said wall portions is corrugated.

3. The device described in claim 1 wherein at least one of said wall portions is defined by a plurality of elements having spaces therebetween, said spaces forming said plurality of ventilating openings in said one of said wall portions.

4. The device described in claim 1 wherein both of said wall portions are corrugated, wherein the corrugations in said one of said wall portions are substantially parallel to the corrugations in said other of said wall portions, wherein said ventilating openings in each of said wall portions extend through only the peaks or only the valleys thereof, and wherein said ventilating openings in said one of said wall portions are sequential with said ventilating openings in said other of said wall portions along a line substantially normal to the axes of said corrugations.

5. The device described in claim 4 wherein the valleys of the corrugations in said one of said wall portions correspond positionally to the valleys in said other of said wall portions, and said ventilating openings in one of said wall portions are positioned in the valleys thereof and said ventilating openings in the other of said wall portions are positioned in the peaks thereof.

6. The device described in claim 5 wherein ventilating openings in the wall portion having holes in the valleys of its corrugations are positioned convectionally above ventilating openings in the wall portion having ventilating openings in the peaks of its corrugations.

7. The device described in claim 4 wherein intumescent material is positioned between said wall portions on the inside of one of said wall portions substantially opposite at least one ventilating opening in the other of said wall portions.

8. The device described in claim 5 wherein ventilating openings in the wall portion having ventilating openings in the peaks of its corrugations are positioned convectionally above ventilating openings in the wall portion having ventilating openings in the valleys of its corrugations.

9. The device described in claim 5 wherein intumescent material is positioned between said wall portions on the inside of one of said wall portions substantially opposite at least one ventilating opening in the other of said wall portions.

10. The device described in claim 4 wherein the valleys of the corrugations in said one of said wall portions correspond positionally to the peaks in said other of said wall portions, and said ventilating openings in both of said wall portions are positioned in the valleys thereof.

11. The device described in claim 4 wherein the valleys of the corrugations in said one of said wall portions correspond positionally to the peaks in said other of said wall portions, and said ventilating openings in both of said openings are positioned in the peaks thereof.

12. The device described in claim 4 wherein intumescent material is positioned between said wall portions on the inside of one of said wall portions substantially opposite at least one ventilating opening in the other of said wall portions.

13. The device described in claim 1 wherein said intumescent material is positioned between said wall portions on the inside of one of said wall portions substantially opposite at least one ventilating opening in the other of said wall portions.

* * * * *